(12) United States Patent
Long et al.

(10) Patent No.: US 9,893,364 B2
(45) Date of Patent: Feb. 13, 2018

(54) POROUS ELECTROLESSLY DEPOSITED COATINGS

(71) Applicant: Velocys, Inc., Plain City, OH (US)

(72) Inventors: Richard Q. Long, New Albany, OH (US); Francis Daly, Waldboro, ME (US); Haibiao Chen, Dublin, OH (US); Terry J. Mazanec, Solon, OH (US)

(73) Assignee: Velocys, Inc., Plain City, OH (US)

( * ) Notice: Subject to any disclaimer, the term of this patent is extended or adjusted under 35 U.S.C. 154(b) by 0 days.

(21) Appl. No.: 14/742,611

(22) Filed: Jun. 17, 2015

(65) Prior Publication Data

US 2015/0288000 A1 Oct. 8, 2015

Related U.S. Application Data

(62) Division of application No. 12/211,004, filed on Sep. 15, 2008, now abandoned.

(Continued)

(51) Int. Cl.
*H01M 4/86* (2006.01)
*C23C 18/16* (2006.01)
(Continued)

(52) U.S. Cl.
CPC ....... *H01M 4/8652* (2013.01); *C23C 18/1662* (2013.01); *C23C 18/1692* (2013.01);
(Continued)

(58) Field of Classification Search
CPC ............. H01M 4/8652; H01M 4/8621; H01M 4/9016; H01M 4/9041; C23C 18/1662; C23C 18/1692; C23C 18/44
(Continued)

(56) References Cited

U.S. PATENT DOCUMENTS 4,892,857 A 1/1990 Tennent et al.
5,100,712 A 3/1992 Maeda et al.
(Continued)

FOREIGN PATENT DOCUMENTS

JP 63-259968 10/1988
JP 2005-280164 A 10/2003
(Continued)

OTHER PUBLICATIONS

Jacoby, Mitch, "Mesoporous Metals: self-assembly steers platinum non-particles to form large pore metallic structures", Chemical and Engineering News, Jun. 30, 2008, vol. 86, p. 10-11.
(Continued)

*Primary Examiner* — Patricia L. Hailey
(74) *Attorney, Agent, or Firm* — Frank Rosenberg (57) ABSTRACT

A new electroless plating approach to generate a porous metallic coating is described in which a metal is electrolessly deposited on a surface. Microparticles in the metal are removed to leave pores in the metal coating. Another method of forming electroless coatings is described in which a blocking ligand is attached to the surface, followed by a second coating step. The invention includes coatings and coated apparatus formed by methods of the invention. The invention also includes catalyst structures comprising a dense substrate and a porous metal adhered to the dense substrate, which is further characterized by one or more of the specified features.

15 Claims, 4 Drawing Sheets

Related U.S. Application Data (60) Provisional application No. 60/972,210, filed on Sep. 13, 2007.

(51) Int. Cl.
*C23C 18/44* (2006.01)
*H01M 4/88* (2006.01)
*H01M 4/90* (2006.01)
*H01M 4/92* (2006.01)

(52) U.S. Cl.
CPC ........... *C23C 18/44* (2013.01); *H01M 4/8621* (2013.01); *H01M 4/8825* (2013.01); *H01M 4/9016* (2013.01); *H01M 4/9041* (2013.01); *H01M 4/92* (2013.01); *Y10T 428/24612* (2015.01)

(58) Field of Classification Search
USPC ................. 502/300, 325, 331, 439; 429/400, 429/523–527
See application file for complete search history.

(56) References Cited

U.S. PATENT DOCUMENTS

| | | |
|---|---|---|
| 5,171,644 A | 12/1992 | Tsou |
| 5,298,280 A | 3/1994 | Kaczur et al. |
| 5,318,803 A | 6/1994 | Bickford et al. |
| 5,443,865 A | 8/1995 | Tisdale et al. |
| 5,500,315 A | 3/1996 | Calvert et al. |
| 5,512,327 A | 4/1996 | Chakraborty |
| 5,627,125 A | 5/1997 | Ebner et al. |
| 5,645,930 A | 7/1997 | Tsou |
| 5,652,020 A | 7/1997 | Collins et al. |
| 5,762,777 A | 6/1998 | Yang et al. |
| 6,099,914 A | 8/2000 | Yoshida et al. |
| 6,207,128 B1 | 3/2001 | Sellin et al. |
| 6,391,477 B1 | 5/2002 | Koslov et al. |
| 6,391,785 B1 | 5/2002 | Satta et al. |
| 6,904,658 B2 | 6/2005 | Hines et al. |
| 7,038,098 B2 | 5/2006 | Walsdorff et al. |
| 7,070,757 B2 | 7/2006 | Fischer et al. |
| 7,109,390 B2 | 9/2006 | Lyznik |
| 7,226,574 B2* | 6/2007 | Long ................ B01D 53/0446 252/373 |
| 8,378,163 B2 | 2/2013 | Ida et al. |
| 2005/0271563 A1* | 12/2005 | Yang ................... B01J 19/0093 422/600 |
| 2006/0115512 A1 | 6/2006 | Peacock et al. |
| 2006/0251910 A1 | 11/2006 | Lancsek et al. |
| 2008/0214884 A1* | 9/2008 | Daly ................... B01J 19/0093 585/700 |
| 2009/0326279 A1* | 12/2009 | Tonkovich ............ B01F 5/0475 568/487 |
| 2010/0310961 A1* | 12/2010 | Clark .................. H01M 8/1226 429/452 |

FOREIGN PATENT DOCUMENTS

| | | | |
|---|---|---|---|
| JP | 2005-280164 | * 10/2005 | ............. B23B 15/04 |
| JP | 2007-197753 | * 8/2007 | ............. C23C 18/16 |

OTHER PUBLICATIONS

Okinaka, Yutaka, "Chapter 16, Electroless Plating of Platinum Group Metals in Electroless Plating Fundamentals" Mallory et al. eds. (1991) p. 421-440.
Rao, et al., "Chemical and electrochemical depositions of platinum group metals and their applications," Coord. Chem. Rev. 249 (2005) 613-631.
Warren et al. "Ordered Mesoporous Materials from Metal Nanoparticle-Block Copolymer Self-Assembly", Science, (Jun. 27, 2008) pp. 1748-1752.
CN Official Action dated 2008_80106712.4, Apr. 18, 2014.
JP Official Action dated 2010-525073 May 30, 2013.
PCT/US2008/076448, International Preliminary Report on Patentability.
PCT/US2008/076448, Written Opinion.

* cited by examiner

POROUS ELECTROLESSLY DEPOSITED COATINGS

RELATED APPLICATIONS

This is a divisional of U.S. patent application Ser. No. 12/211,004, filed Sep. 15, 2008, now abandoned; and in accordance with 35 U.S.C. sect. 119(e), this application claims priority to U.S. Provisional Application No. 60/972,210, filed Sep. 13, 2007.

INTRODUCTION

There has been a long history of work devoted to forming porous metal coatings. For example, in U.S. Pat. No. 1,628,190, issued in 1927, Raney described a method of making porous nickel by alloying the nickel with aluminum and subsequently dissolving the aluminum to leave porous nickel.

More recently, there has been a great deal of interest in forming metallic coatings in microchannels. Tonkovich et al. in WO 2006/127889A2 (PCT/US2006/020220, which is incorporated herein as if reproduced in full) describe a variety of microchannel apparatus and numerous ways of forming catalysts on microchannel walls including designs for structured walls that may be subsequently coated with a catalyst. The patent also mentions the use of a polymeric templating agent followed by treatment with a metallic templating agent and an oxidation step to form a porous metallic structure.

Electroless plating of metals such as platinum on substrates has attracted much interest because it can improve resistance to corrosion and abrasion, or increase desirable electrical properties, or act as catalysts for various chemical reactions. Pt and Pt-alloy catalysts have been widely used as catalysts for various chemical reactions, such as steam methane reforming, partial oxidation, $CO_2$ reforming, autothermal reforming of gasoline, combustion, ammonia oxidation, dehydrogenation and hydrocracking of alkanes, oxidative dehydrogenation of alkanes and NOx abatement in automotive emission control. They are also used as anode and cathode catalysts in low-temperature fuel cells such as alkaline fuel cell, phosphoric acid fuel cell, proton exchange membrane fuel cell and direct methanol fuel cell. It is expected that higher Pt surface area will result in higher catalytic activity. However, electroless plating and electroplating usually generate a dense Pt layer with low surface area.

In U.S. Pat. No. 3,486,928 (1969), Rhoda and Vines used a solution containing $Na_2Pt(OH)_6$, NaOH, ethylamine and hydrazine for electroless Pt plating. However, hydrazine is not stable in this system and thus needs to be added in situ. In DE patent 2607988 (1977), JP patent 84-80764 (1984) and U.S. Pat. No. 6,391,477 (2002), $Pt(NH_3)_2(NO_2)_2$ was used as a Pt salt and hydrazine was a reducing agent for plating. $Pt(NH_3)_2(NO_2)_2$ salt is hard to dissolve into water. In order to increase its solubility, sometimes ammonium hydroxide is added in the solution. This will bring some challenges in plating Pt in small channels, such as microchannel devices. Many plating steps are necessary to reach targeted loadings. For instance, to get 10 mg/in$^2$ Pt loading in a microchannel with a dimension of 1 inch×0.18 inch× 0.046 inch, it needs 17 plating processes by using a solution with 2 g/L Pt solution (e.g., $Pt(NH_3)_2(NO_2)_2$ salt). By comparison, it needs only one coat if a 30 g/L Pt solution is used. We discovered that $Pt(NH_3)_4(NO_3)_2$ and $Pt(NH_3)_4(OH)_2$ can be used as Pt salts for electroless plating. Both salts can dissolve into water in a large amount. However, as described above, the generated Pt layer has low Pt surface area.

German patent DE2607988 (1977) reported an example of an electroless rhodium plating bath using rhodium ammine nitrite, i.e., $(NH_3)_xRh(NO_2)_y$, hydrazine as reducing agent, and ammonium hydroxide as complexing agent. The rhodium ammine nitrite was prepared by reaction of rhodium chloride with excess sodium nitrite and ammonium hydroxide. Similarly, U.S. Pat. No. 6,455,175 (2002) reported a composition for electroless Rh plating using rhodium ammine nitrite, ammonium hydroxide and hydrazine hydrate. The rhodium ammine nitrite was synthesized by reacting $K_3[Rh(NO_2)_3Cl_3]$ with $NH_4OH$ in this patent. For these two processes, the Rh reduction process is so fast that many bubbles are generated. Rh precipitation is also seen in the solution. It is clear that these plating processes are impractical for coating a microchannel device due to bubble formation and Rh precipitation. Also the bubbles promote non-uniformity of the Rh coating. The Rh precipitation also results in a high cost because Rh is expensive. JP58204168 (1983) provided a Rh plating bath using rhodium ammine chloride, a hydroxyl amine salt as a stabilizer and hydrazine as a reducing agent. The $Rh(NH_3)_6Cl_3$ was prepared by reacting $RhCl_3$ with concentrated $NH_4OH$ at 150° C. and 20 atm in an autoclave. However, the $Rh(NH_3)_6Cl_3$ is only slightly soluble in water and thus makes the plating process costly for handling so much waste liquid. Also many plating cycles are necessary to get the targeted loading for microchannel device due to the low volume/surface ratio.

JP2000282248 (2000) reported Rh plating baths with ammonium-di(pyridine-2,6-dicarboxylate)-rhodium (III), $RhCl_x(NH_3)_{6-x}$ (x denotes 0 to 3), rhodium acetate, a triethylenetetramine complex of rhodium chloride or a diethylenetriamine complex of rhodium. The deposition is executed preferably at a pH 8 to 9 at 70-95° C. While electroless plating has many advantages over other plating methods, including the ability to plate almost any substrate and the ability to achieve uniform coating loadings over objects of almost any shape, coatings prepared by electroless plating are dense with low surface area. Conventional electroless plated coatings require high metal loadings and produce low surface area coatings which limits their utility, particularly for catalytic applications of precious metals wherein effective use of the expensive metals is important for economic as well as technical reasons. Thus a need exists for an electroless plating process that produces a porous, high surface area coating and can be used with precious metals as well as other metals.

SUMMARY OF THE INVENTION

This invention provides a new electroless plating approach to generate a porous metallic coating. The porous catalyst metal has a higher surface area and thus will exhibit higher activities in chemical reactions. The porous coating requires lower metal loading to achieve the same exposed surface area thus producing a more economically attractive coating. The electroless plating approach deposits a metal such as Pt, Pd, Rh, Ag, Cu, Au, Fe, Co, Re, and their alloys. For example, the formed porous Pt can be used for preparing Pt alloy catalysts, e.g., Pt—Rh, Pt—Pd, Pt—Au, Pt—Pd—Au, Pt—Cu and Pt—Ag.

In a first aspect, the invention provides a method of forming a metal coating on a substrate, comprising: providing a liquid composition comprising a metal complex;

contacting the substrate with microparticles; contacting the substrate with the liquid composition; reacting the metal complex with a reducing agent; and removing the microparticles to form a porous metal coating on the substrate. The porous metal coating contains pores dispersed in the metal coating that correspond in size to the microparticles. At least initially the size of the microparticles and the pores is about the same since the particles are oxidized or dissolved away; however, the pore sizes may change if the porous meal coating is subsequently heated or subjected to corrosive conditions. The invention also includes metal coatings or membranes made by this method. The invention also includes microchannel apparatus in which at least one interior microchannel wall comprises a porous metal coating made by the inventive method.

In some embodiments, the porous coating is modified by addition of additional metals, oxides or sols. In some preferred embodiments, the reducing agent is added to the composition prior to adding the composition into a microchannel. Alternatively, the reducing agent can be added after contacting the liquid composition and the substrate. Preferably, the microparticles are polymeric microspheres that are removed by calcining in the presence of oxygen.

In another aspect, the invention provides a catalyst structure, comprising: a dense substrate, and a porous metal adhered to the dense substrate, and one or more of the following features: a second material (in addition to the porous metal) filling the pores in the porous metal, wherein the second material comprises an ionic conductor; or an average pore size of at least 1 micron in the porous metal; or a bi-modal distribution of pore sizes in the porous metal; or the surface area of the porous metal exceeds 100 m$^2$/m$^3$. The inventive structure can comprises any combination of the features mentioned above. Preferably, the dense substrate comprises a metal wall of a microchannel apparatus. In another embodiment, the dense substrate comprises an electrode. The invention also includes microchannel apparatus such as a chemical reactor, chemical separator, or fuel cell comprising the inventive structure.

In a further aspect, the invention provides a method of forming layers of a metal on a surface, comprising: (1) electrolessly plating metal onto a surface; (2) attaching a blocking ligand to the electrolessly plated metal; and (3) electrolessly plating the same or a different metal onto the material resulting from step (2).

In another aspect, the invention provides a method of making the membrane and the resulting membrane. A membrane can be formed by removing the coating from a substrate to form a film-like (or ribbon) material that can be treated from opposite sides to partially or completely fill the pores. In another embodiment the membrane can be formed by electrolessly plating on a porous substrate containing pores sufficiently small holes or pores that they are filled by the plating metals. The active membrane material could be the porous substrate, the electroless plated metal(s) or the combination of the two phases. In still another embodiment, a previously prepared membrane that contains small holes can be made leak-free by conducting the electroless plating by introducing the metal and reducing agents from opposing sides of the membrane and allowing them to react at the holes between the two sides, plating within these pores and thus sealing the membrane.

Glossary

A "bimodal pore distribution" is in a material in which there pores are substantially divided into two distinct and non-overlapping size ranges: a first group composed of relatively large pores that correspond to the size of the microparticles, and a second group of relatively small pores. Preferably, the large pores are in the size range of 0.1 to 10 micrometers (μm) and the small pores are 10 nm or less and in some embodiments in the range from 1 to 10 nm. Preferably, at least 90%, more preferably at least 95%, of total pore volume is within the two ranges that define the bimodal distribution.

A "complex microchannel" is in apparatus that includes one or more of the following characteristics: at least one contiguous microchannel has a turn of at least 45°, in some embodiments at least 90°, in some embodiments a u-bend; a length of 50 cm or more, or a length of 20 cm or more along with a dimension of 2 mm or less, and in some embodiments a length of 50-500 cm; at least one microchannel that splits into at least 2 sub-microchannels in parallel, in some embodiments 2 to 4 sub-channels in parallel; at least 2 adjacent channels, having an adjacent length of at least one cm that are connected by plural orifices along a common microchannel wall where the area of orifices amounts to 20% or less of the area of the microchannel wall in which the orifices are located and where each orifice is 1.0 mm$^2$ or smaller, in some embodiments 0.6 mm$^2$ or smaller, in some embodiments 0.1 mm$^2$ or smaller— this is a particularly challenging configuration because a coating should be applied without clogging the holes; or at least two, in some embodiments at least 5, parallel microchannels having a length of at least 1 cm, have openings to an integral manifold, where the manifold includes at least one dimension that is no more than three times the minimum dimension of the parallel microchannels (for example, if one of the parallel microchannels had a height of 1 mm (as the smallest dimension in the set of parallel microchannels), then the manifold would possess a height of no more than 3 mm). An integral manifold is part of the assembled device and is not a connecting tube. A complex microchannel is one type of interior microchannel.

The electrolessly deposited coatings are preferably post-assembly coatings. A "post-assembly" coating is applied onto three dimensional microchannel apparatus. This is either after a laminating step in a multilayer device made by laminating sheets or after manufacture of a manufactured multi-level apparatus such as an apparatus in which microchannels are drilled into a block. This "post-assembly" coating can be contrasted with apparatus made by processes in which sheets are coated and then assembled and bonded or apparatus made by coating a sheet and then expanding the sheet to make a three-dimensional structure. For example, a coated sheet that is then expanded may have uncoated slit edges. Uncoated surfaces of all types, such as slit edges, can undergo corrosion or reaction under reaction conditions. Thus, it is advantageous to coat the device after assembly to protect all of the internal surface against corrosion. The post-assembly coating provides advantages such as crack-filling and ease of manufacture. Additionally, the aluminide or other coating could interfere with diffusion bonding of a stack of coated sheets and result in an inferior bond since aluminide is not an ideal material for bonding a laminated device and may not satisfy mechanical requirements at high temperature. Whether an apparatus is made by a post-assembly coating is detectable by observable characteristics such as gap-filling, crack-filling, elemental analysis (for example, elemental composition of sheet surfaces versus bonded areas) Typically, these characterisitics are observed by optical microscopy, electron microscopy or electron microscopy in conjunction with elemental analysis. Thus, for a given apparatus, there is a difference between pre-assembled and post-assembled coated devices, and an analysis using well-known analytical techniques can establish whether a coating was applied before or after assembly (or manufacture in the case of drilled microchannels) of the microchannel device.

A "separator" is a type of chemical processing apparatus that is capable of separating a component or components from a fluid. For example, a device containing an adsorbent, distillation or reactive distillation apparatus, etc.

Microchannel reactors are characterized by the presence of at least one reaction channel having at least one dimension (wall-to-wall, not counting catalyst) of 1.0 cm or less, preferably 2.0 mm or less (in some embodiments about 1.0 mm or less) and greater than 100 nm (preferably greater than 1 μm), and in some embodiments 50 to 500 μm. A reaction channel is a channel containing a catalyst. Microchannel apparatus is similarly characterized, except that a catalyst-containing reaction channel is not required. Both height and width are substantially perpendicular to the direction of flow of reactants through the reactor. Microchannels are also defined by the presence of at least one inlet that is distinct from at least one outlet—microchannels are not merely channels through zeolites or mesoporous materials. The height and/or width of a reaction microchannel is preferably about 2 mm or less, and more preferably 1 mm or less. The length of a reaction channel is typically longer. Preferably, the length of a reaction channel is greater than 1 cm, in some embodiments greater than 50 cm, in some embodiments greater than 20 cm, and in some embodiments in the range of 1 to 100 cm. The sides of a microchannel are defined by reaction channel walls. These walls are preferably made of a hard material such as a ceramic, an iron based alloy such as steel, or a Ni-, Co- or Fe-based superalloy such as monel. The choice of material for the walls of the reaction channel may depend on the reaction for which the reactor is intended. In some embodiments, the reaction chamber walls are comprised of a stainless steel or Inconel® which is durable and has good thermal conductivity. The alloys should be low in sulfer, and in some embodiments are subjected to a desulfurization treatment prior to formation of an aluminide. Typically, reaction channel walls are formed of the material that provides the primary structural support for the microchannel apparatus. The microchannel apparatus can be made by known methods (except for the coatings and treatments described herein), and in some preferred embodiments are made by laminating interleaved plates (also known as "shims"), and preferably where shims designed for reaction channels are interleaved with shims designed for heat exchange. Some microchannel apparatus includes at least 10 layers laminated in a device, where each of these layers contain at least 10 channels; the device may contain other layers with fewer channels.

DESCRIPTION OF THE INVENTION

The solid metal coating is formed from a liquid composition (a metal complex is dissolved in a liquid). The starting material typically comprises an aqueous solution of a metal complex. The metal complex could be any metal complex suitable for use in electroless plating. Examples include $Pt(NH_3)_4(OH)_2$ and Rh amine hydroxide $Rh(NH_3)_x(OH)_y$. The technique is broadly applicable to metals that can be deposited by electroless plating. A nonlimiting list of other potential ligands includes nitrates, nitrites, chlorides, bromides, iodides, sulfates, sulfites, phosphates, phosphites, acetates, and oxalates. In preferred embodiments, the liquid composition comprises Pt, Pd, Rh, Ag, Cu, Au, Fe, Co, or Re, or combinations of these metals. These metals have known methods for electroless deposition and can be useful catalysts. In some preferred embodiments, the liquid composition comprises 0.0001 weight % to 2.0 weight % of a metal or metals, more preferably 0.2 to 2.0 weight percent (more preferably one or more metals selected from Pt, Pd, Rh, Ag, Cu, Au, Fe, Co, and Re). Weight percent refers to the mass of metal atoms divided by the mass of liquid composition multiplied by 100. The liquid composition preferably has a pH of at least 5.

Polymers or other removable small particles can be added to the electroless plating solution during the plating or washcoated on the substrate prior to plating. The polymers can be, but are not limited to, polystyrene latex, polyethylene, polyethylene glycols and their derivatives, aldehyde polymers, polyethylene oxides, poly(2-ethyl-2-oxazoline), polypropylene glycols, polystyrene, polyvinyl acetate, polyvinyl alcohol, polyvinylpyrrolidone, polyoxyalkylenes, polyesters and polycarbonates. The polymer is preferably in the form of polymer microparticles. The microparticles are preferably approximately spherical, but could be other shapes such as rods or irregular shapes. Materials that volatilize when heated in the presence of oxygen are particularly desirable since they can easily be removed by calcination; however, dissolvable materials could also be used and removed by treatments with the appropriate solvent(s). In one preferred embodiment, a surface is pretreated with an aqueous dispersion of polymer particles. In another preferred embodiment, the electroless plating composition (which is preferably aqueous) comprises a metal complex and a dispersion of polymer particles and the metal and polymer are deposited in the same step.

The microparticles could comprise any material that can readily be incorporated in the coating during electroless plating and at least partially removed after the electroless plating step. Hydrocarbons such as polymers, carbon, waxes, starch, or the like can be incorporated and removed later, for example by pyrolysis or combustion or solvent extraction. The microparticles could also comprise mixtures of removable and non-removable materials. The non-removable materials are those which are not removed by combustion or solvent extraction. When solvent extraction is used, the solvent is typically an organic solvent. The non-removable material(s) could be separate particles or within the same particles as the removable material. The non-removable materials may include sol or gel precursors, metal oxides, metal particles, or the like. Materials that are not removed from the coated layer could provide additional catalytic functionality (for example a bimetallic catalyst), or inhibit sintering of the porous metallic structure, or provide other functionality. When the non-removable material is within the same particle as the removable material, the resulting structure may have the non-removable material exposed within the pores. In some cases, the non-removable material could be selected to migrate into and/or react with the deposited metal during the burn out or a subsequent heat treatment. Some preferred non-removable materials include zeolites, $Al_2O_3$, $SiO_2$, $ZrO_2$, $TiO_2$, $CeO_2$, MgO and their mixtures.

The size of the microparticles is preferably in the range of 0.001 to 1000 microns (μm), more preferably 0.01 to 100 microns, in some embodiments at least 1 μm, and in some embodiments in the range of 0.1 to 10 microns. After particle removal, the metal is left with pores having the sizes of the removed particles. In some cases, two or more types of particles could be used; a first type that is removed first (such as by a solvent) and a second type that is removed subsequently (such as by calcining or by a second solvent). This could be used to create a bimodal pore distribution. To form an interpenetrating network, a second material could be used to fill the pores. The metal and the microparticles could be applied on any substrate, including powders (oxides, catalyst supports, zeolites, etc.), glass, fibers, ceramic materials and metallic materials. The substrates could have a flat surface or a modified surface with various geometries (e.g., pores or microchannels). The surface of the substrates may be treated with other metals, such as Cu, Pt and Pd, prior to plating with Rh or another metal. This process can also be used for plating alloys (e.g., Pt—Rh alloy) simultaneously. The substrate surface may also be modified with pre-coating with metal, transition metal oxide, rare earth oxide, alkaline earth oxide or combinations of these prior to electroless plating. Treatment with a pre-coat of a metal oxide (preferably comprising a rare earth metal oxide) can enhance adhesion of the electrolessly applied metal. The substrates can be a flat surface (for example, a flat channel wall), a surface modified with various geometries (e.g., etched features, microchannel walls with patterned features), foam, felt, etc.

In their broader aspects, the inventive techniques are applicable to a wide variety of substrates includes metals, ceramics and plastics of any shape. Dense substrates are preferably metals (not porous metals) as are well-known conventional materials such as steel, stainless steel, and superalloys. In particularly preferred embodiments, the porous metal coating is formed on one or more surfaces of a microchannel (or, more typically, microchannels) within a microchannel device. Microchannels have at least one dimension of 1 cm or less, preferably 2 mm or less, and in some embodiments 0.1 mm to 1 mm. Microchannel apparatus is well known and we have found that electroless plating is especially well-suited to coat the microchannels. The invention is especially useful in forming post-assembly coatings and forming coatings on microchannel walls in complex microchannels.

Microchannel apparatus typically contains numerous channels. In many applications, the electroless plating solution is added to selected channels; for example, at least 3 channels are treated with an electroless plating solution while at least 2 other channels in the same apparatus are not treated. In some preferred embodiments, all sides of a selected microchannel (as opposed to a single side) are coated with a catalytic metal. The catalyst material can comprise a porous metal or an interpenetrating network.

Substrates for interpenetrating networks can be any of the substrates previously mentioned. In a preferred embodiment, the substrate is a dense material, preferably a metal. The electrolessly applied coating adheres to the substrate and may have any of the pore sizes (or, in the case of an IPN, a second material filling the pores) mentioned previously.

The invention is broadly applicable for a variety of electroless plating conditions. The metal layer is deposited from solution by reacting a metal complex with a reducing agent. Typically, reducing agents could include hydrazine, sodium boron hydride, sodium hypophosphite, dimethyl amine borane, diethyl amine borane and sodium borohydride, and mixtures thereof, preferably hydrazine or sodium borohydride. At the time of deposition, the pH of the solution (liquid composition plus reducing agent, plus any additional. optional components) is preferably at least 10. The deposition can be conducted at room temperature, or at elevated temperatures for faster deposition.

After the electroless formation of a layer, the removable material such as a polymer(s) is removed and a porous metal layer is formed. The polymer(s) is removed by calcination or by dissolving in solvents. The calcination temperature could be in the range of 100-800° C., preferably 400-600° C. The solvents could include alcohol, hydrocarbons, acetone, benzenes, and any other organic solvents.

Polymers are preferably removed from the plating by calcination in the presence of oxygen at a temperature of at least 400° C. In some embodiments, the calcination is conducted in the presence of flowing air or oxygen.

The porous Rh and Pt have high surface area and could be a superior electroless plated catalyst for various chemical reactions, such as steam reforming, especially steam methane reforming (SMR), partial oxidation, selective oxidation, and combustion. Electroless plated rhodium metal exhibits good catalytic performance for steam methane reforming and fuel-rich combustion. As compared to slurry washcoating, electroless plating of Rh is a simpler and higher quality technique, especially for microchannel channel devices with jet hole designs for the staged addition of a chemical reactant, e.g., oxygen. It is expected that a porous Rh surface will exhibit higher catalytic activity than a non porous or dense Rh plated surface due to its higher surface area.

The resulting electrolessly deposited metals can have a well-defined porosity (controlled by the size of the particles). For example, if desired, the pore sizes can be highly uniform with 80% or more of the pore volume comprised of pores that vary in size by 20% or less (as measured by BET or Hg porosimetry). In preferred embodiments, the porous structure is random and isotropic.

In some cases, a second metal can be coated over the porous metal layer. The second metal can be deposited either in the presence or absence of microparticles. This could be repeated for any desired number of layers.

The porous coated surface formed by electroless plating of metals in the presence of microparticles could be further functionalized by addition of metals, oxides, or other materials to form an interpenetrating network of two or more materials after the removal of the removable material. The addition could be by impregnation, vapor coating, electroless coating, or other technique. The added material could provide additional catalytic activity, modify the activity of the deposited porous material, provide structural support, or inhibit structural evolution under processing or process conditions. The added material could also have transport properties, such as oxide, hydroxyl or hydrogen ion conductivity. Such an interpenetrating network is expected to be an excellent electrode for a fuel cell, battery or other electrical device. An interpenetrating network of materials with electrical conductivity and ion conductivity could also function as a membrane. Preferred materials with ionic conductivity include oxides of zirconia, optionally stabilized in the cubic form with Mg, Ca, Y or other rare earth metal, ceria, optionally stabilized by Gd, Eu or other rare earth metal, perovskites of formulation M1M2Ox wherein M1 is chosen from among Fe, Co, Cr, or some combination, M2 is chosen from among Ba, Sr, La, rare earths, or some combination thereof, BiVMOx materials, where M can be any transition metal or combination thereof. Preferably the fractional volume of the electrical conducting phase in the IPN of electrical and ion conductive phases is between 0.1 and 0.9, more preferably 0.2 and 0.8 and most preferably between 0.3 and 0.7. Particularly advantaged combinations are Pt as the metallic phase and yttria-stabilized zirconia as the oxide conducting phase, and other combinations as described in U.S. Pat. No. 5,306,411 which is incorporated herein by reference.

Examples of making porous electrolessly deposited coatings have been shown with Rh, Pt, and Pt—Rh. In one example, an alumina surface was treated with an aqueous composition containing $Pt(NH_3)_4(OH)_2$, hydrazine, and 1.75 micrometer polystyrene microspheres for several hours. The coating was dried and calcined in air. The resulting Pt coating was highly porous. Then, a Rh layer was electrolessly deposited in the absence of microspheres. Surprisingly, the Rh layer deposited at a rate several times greater as compared to Rh deposition on a conventional Pt layer (prepared without microspheres). The coatings have been characterized by SEM and tested for catalyzing fuel-rich combustion in a microchannel. The catalyst prepared using microspheres contained a much higher Rh concentration (due to the faster deposition rate) and demonstrated substantially improved combustion performance. Electroless plating of Rh in the presence of microspheres similarly resulted in a porous Rh coating.

EXAMPLE 1

Reference

Figure 1:
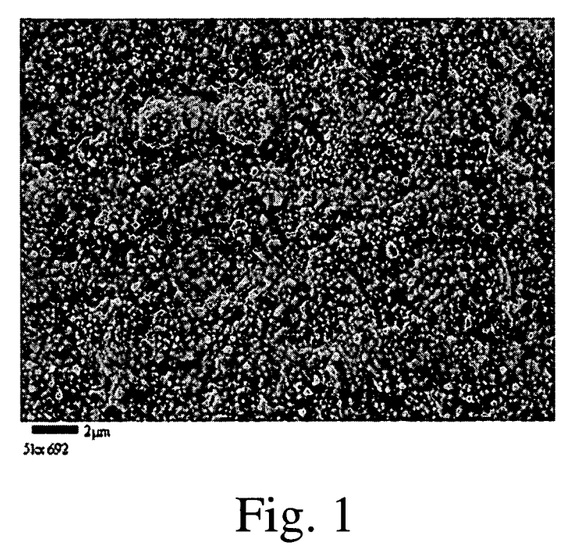
FIG. 1 is a SEM micrograph of Pt plated coupon without microspheres (example 1).

A solution consisting of $Pt(NH_3)_4(OH)_2$, (0.2 wt % Pt) and 0.2 wt % $N_2H_4.H_2O$ was prepared. An aluminized alloy 617 coupon was heat-treated at 1050° C. for 10 hours before use. The surface of this coupon was covered by an $\alpha$-$Al_2O_3$ scale. The coupon was hung in the solution at room temperature overnight. 11.4 mg/in$^2$ Pt was plated on the coupon. After that, the Pt plated coupon was put in a new Pt plating solution with the same composition for 3 hours. Next the coupon was cleaned and calcined at 500° C. for 1 h in air. The final Pt loading was 15.7 mg/in$^2$. The SEM micrograph shows that the Pt layer is flat and dense (FIG. 1).

EXAMPLE 2

Figure 2:
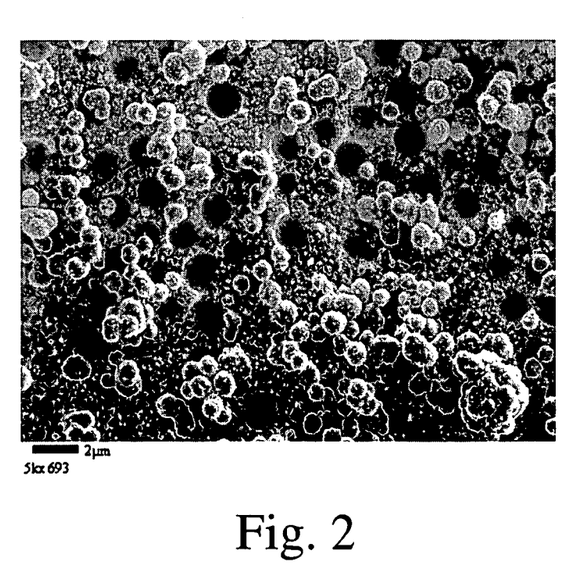
FIG. 2 is a SEM micrograph of Pt plated coupon with microsphere washcoating (example 2).

An aluminized Inconel 617, heat treated and Pt-plated coupon (15 mg/in$^2$ Pt) was coated with 0.11 mg polystyrene microsphere (1.7 μm) and dried at room temperature. Next the coupon was put in a solution consisting of $Pt(NH_3)_4(OH)_2$, (0.2 wt % Pt) and 0.2 wt % $N_2H_4.H_2O$ for 20 hours at room temperature. The coupon was then cleaned and calcined at 500° C. for 1 h in air. 11 mg/in$^2$ Pt was plated on the coupon. SEM micrograph shows that the surface Pt layer is porous (FIG. 2). Bimodal pores (1.7 μm and 50-100 nm) are observed.

EXAMPLE 3

Figure 3:
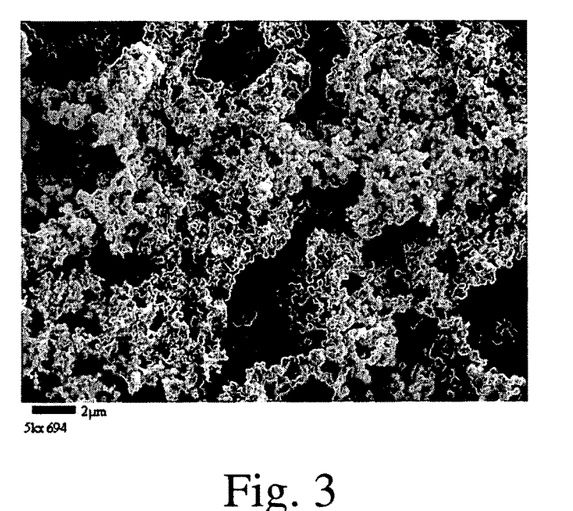
FIG. 3 is a SEM micrograph of Pt plated coupon with microspheres in plating solution (example 3).

An aluminized Inconel 617, heat treated and Pt-plated coupon (15 mg/in$^2$ Pt) was put in a solution consisting of $Pt(NH_3)_4(OH)_2$, (0.2 wt % Pt), 0.2 wt % $N_2H_4.H_2O$ and 1.0 wt % polystyrene microsphere (1.7 μm) for 20 hours at room temperature. The coupon was then cleaned and calcined at 500° C. for 1 h in air. 12 mg/in$^2$ Pt was plated on the coupon. SEM micrograph shows that the surface Pt layer is very porous (FIG. 3). Pt particle size is in the range of 100 to 200 nm.

EXAMPLE 4

Figure 4:
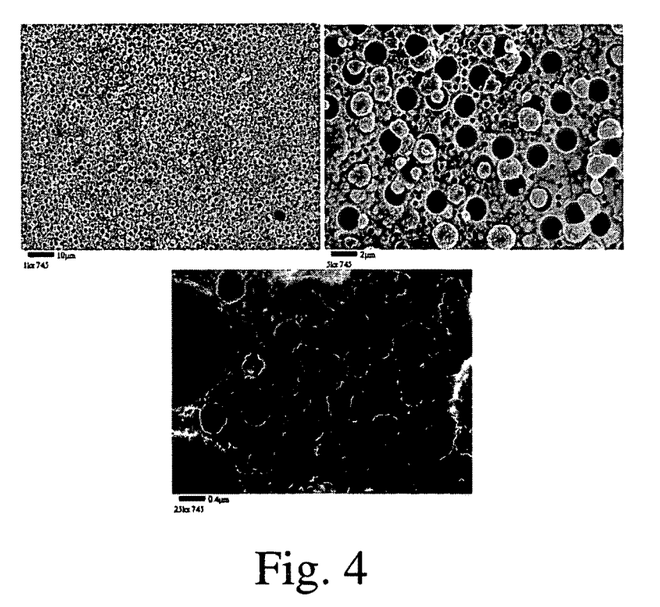
FIG. 4 shows SEM micrographs of a porous Pt layer that has been subsequently plated with Rh.

An aluminized Inconel 617 coupon is heat-treated at 1050° C. for 10 hours prior to use. The surface of the coupon is covered with an $\alpha$-$Al_2O_3$ scale. The coupon is then put in a solution consisting of $Pt(NH_3)_4(OH)_2$, (0.2 wt % Pt) and 0.2 wt % $N_2H_4.H_2O$. The plating is performed at room temperature for 4 hours. The Pt loading is 3.0 mg/in$^2$. The Pt-plated coupon was put in a solution consisting of 0.23 wt % Rh as $Rh(NH_3)_x(OH)_3$, 4.4 wt % $NH_4OH$, 15.4 wt % $N_2H_4.H_2O$ and 1.0 wt % polystyrene microsphere (1.75 μm) for 21 hours at room temperature. The coupon was rinsed with $H_2O$ and calcined at 500° C. for 1 h in air. 10 mg/in$^2$ Rh was plated on the coupon. SEM micrographs show that the Rh layer consists of porous and tri-modal as illustrated in FIG. 4.

EXAMPLE 5

A solution consisting of $Pt(NH_3)_4(OH)_2$, (0.2 wt % Pt) and 0.2 wt % $N_2H_4.H_2O$ was prepared. An aluminized alloy 617 coupon was heat-treated at 1050° C. for 10 hours before use. The surface of this coupon was covered by an $\alpha$-$Al_2O_3$ scale. The coupon was hung in the solution at room temperature for 16 hours. 7 mg/in$^2$ Pt was plated on the coupon. After that, the Pt plated coupon was put in a new Pt plating solution with the same composition for 5 hours. Totally 16 mg/in$^2$ dense Pt was plated on the coupon. Next the dense Pt-plated coupon was put in a solution consisting of $Pt(NH_3)_4(OH)_2$, (0.2 wt % Pt), 0.2 wt % $N_2H_4.H_2O$ and 1.0 wt % polystyrene microsphere (1.7 μm) for 7 hours at room temperature. After that, the Pt plated coupon was put in a new Pt plating solution with microsphere for 10 hours. The coupon was then cleaned and calcined at 500° C. for 1 h in air. 16 mg/in$^2$ porous Pt was plated on the coupon.

Catalyst coupon was tested in a two inch long microreactor. The reactor is made from a 0.5" OD alloy 617 rod which is 2" long. A slot sized 0.377"×0.021"×2" was cut at the center to fit the catalyst coupon and another slot adjacent to the insert is EDM (electro discharge machining) wire cut at 0.335"×0.01"×2" for reactant gases to flow by the catalyst insert. The microreactor was aluminized and heat-treated prior to catalyst coupon loading. The catalyst was tested under the conditions of 3.2 ms contact time, 0.6% $CH_4$, 2.0% CO, 4.3% $O_2$, 14.5% $H_2O$ and balance $N_2$. At 850° C., the initial $CH_4$ conversion was 67% and CO conversion was 100%. After 1700 hours on stream, $CH_4$ conversion was increased to 77% and CO conversion was kept at 100%. No deactivation was observed during the testing period.

EXAMPLE 6

COMPARATIVE EXAMPLE

Figure 5:
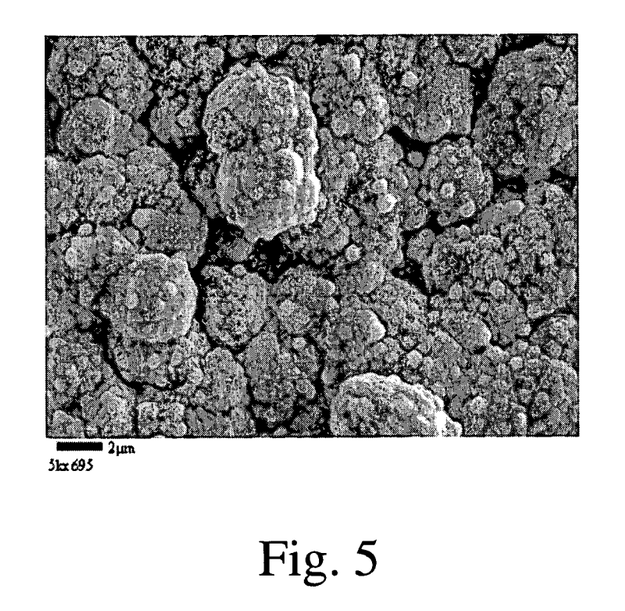
FIG. 5 is a SEM micrograph of a Pt plated coupon with PVA in the plating solution (example 6).
Figure 6:
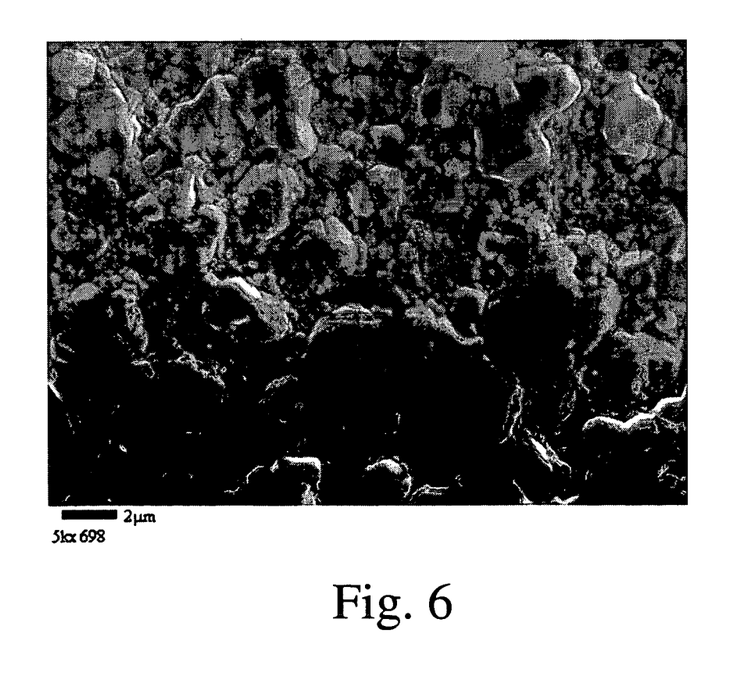
FIG. 6 shows a SEM micrograph of a Pt plated coupon that was formed without microparticles and calcined at 900° C. in air.

An aluminized Inconel 617 coupon was heat-treated at 1050° C. for 10 hours prior to use. The surface of the coupon was covered with an $\alpha$-$Al_2O_3$ scale. The coupon was put in a solution consisting of $Pt(NH_3)_4(OH)_2$, (0.2 wt % Pt) and 0.2 wt % $N_2H_4.H_2O$. The plating was performed at room temperature for 18 hours. The Pt loading was 18.0 mg/in$^2$. The Pt plated coupon was then put in a solution consisting of Pt(NH$_3$)$_4$(OH)$_2$, (0.2 wt % Pt), 0.2 wt % N$_2$H$_4$.H$_2$O and 1.0 wt % poly vinyl alcohol (PVA, Alfa Aesar) for 20 hours at room temperature. The plating process was repeated once. The coupon was cleaned and calcined at 500° C. for 1 h in air. An additional 9 mg/in$^2$ Pt is plated on the coupon. However, SEM micrograph shows that the surface Pt layer was not porous (FIG. 5), which is different from Example 3.

EXAMPLE 7

Morphology after Heat Treatment

Figure 7:
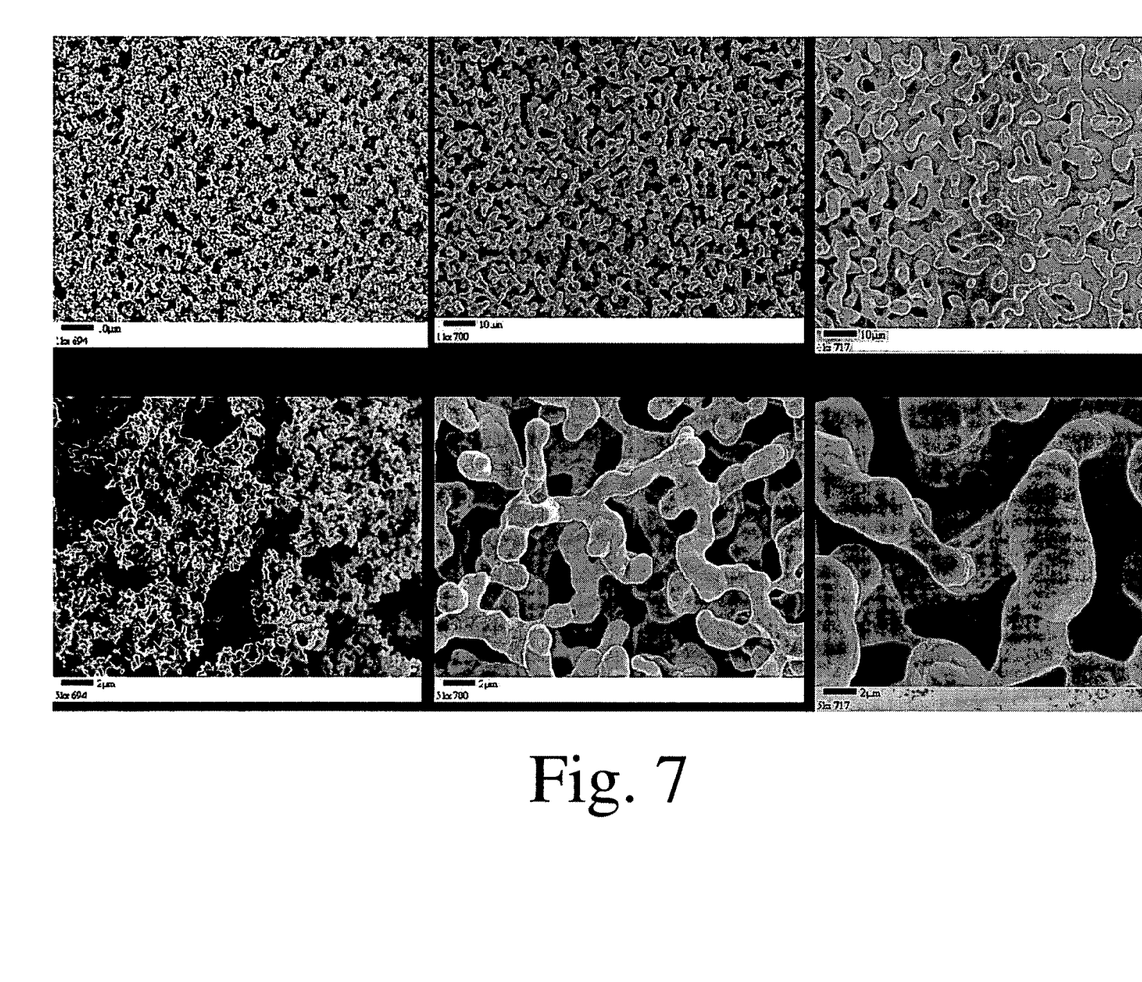
FIG. 7 shows SEM micrographs of a porous Pt layer (such as Example 3) after calcining in air at various times.

The porous structure obtained in Example 3 was subjected to additional heat treatment. As can be seen in FIG. 7, the large pore morphology remains present after heat treatment.
Discussion of Results A total of 8 types of polymer were tried as the pore forming material including the conventional pore formers polyvinylalcohol (PVA), polyester and P123 (poly(ethylene oxide)-poly(propylene oxide)-poly(ethylene oxide) triblock copolymer). Of these, only polystyrene beads (obtained from Bangs Labs, particle diameter=1.75 µm, suspension pH=7.4) formed a porous Pt layer with dispersed pores. Data is presented in the following table:

| Supplier | dispersed pores | Material | Particle diameter (µm) | Materials Density (g/cm$^3$) | Surface group | Surface group density |
|---|---|---|---|---|---|---|
| Bangs Labs | Y | Polystyrene | 1.75 | 1.06 | —COOH —SO$_4$ | 0.013 mmol/g polymer |
| Bangs Labs | N | Polystyrene | 0.35 | 1.06 | —COOH —SO$_4$ | |
| Alfa Aesar | N | Polystyrene | 0.34 | 1.06 | —COOH —SO$_4$ | |
| Fluka | N | Melamine Resin | 2.0 | 1.51 | — | |
| Fluka | N | Polymethacrylate | 1.0 | 1.22 | — | |
| Fluka | N | Melamine Resin | 3.0 | 1.51 | —COOH | 0.01 mmol/g polymer |

While the invention is not limited to a particular mechanism, based on our experiments, we can propose the following explanation. The deposition of microspheres is a complicated process. The microspheres are constantly moving in the plating solution due to Brownian motion. As they move, they can collide with each other as well as with the substrate. The frequency of collision depends on the concentration of the microspheres and how fast the microspheres move. For the same weight concentration (e.g. 1% in our experiment), smaller microspheres have a higher number concentration. In addition, smaller and lighter particles move faster than larger and heavier particles. Therefore, smaller and lighter particles collide more often. If at each collision the microspheres attach to their target, we can expect that smaller and lighter particles deposit faster. To produce a porous platinum layer (with well-dispersed large pores) on a surface, we need to deposit both platinum and polymer microspheres onto the surface at similar rates. If platinum plates faster than the microspheres deposit, we can only have a dense platinum layer. If the platinum plates slower, we may have little or no platinum coating on the substrate because the substrate is completely covered by the polymer.

In view of the complexities, it is surprising that we obtained a metal coating with well-dispersed polymer spheres. It is also surprising that the deposition appears relatively unaffected by gravity. In preferred embodiments, surfaces of a microchannel are coated with a porous metal coating that varies by 50% or less (deviation from thickness averaged over all coated surfaces), more preferably varies by 20% or less, regardless of gravity, in a device that is stationary during the coating process. Preferably, the polymer is in the form of microspheres, preferably these microspheres are in the size range of 1.4 to 2.0 micrometers (µm), more preferably 1.6 to 1.9 µm. Preferably, the metal comprises Pt. In some preferred embodiments, the density of the polymer is in the range of 0.90 to 1.20 g/cc, in some embodiments 1.00 to 1.10 g/cc.

In view of the teachings and examples described herein, it is possible, through no more than routine experimentation, to obtain porous metal coatings (obtained through electroless plating) with well dispersed large pores of a desired shape (preferably spherical pores). It is believed that these coatings are superior to coatings that could be obtained from other processes such as Raney metals and deposition from colloidal metal solutions.
Electroless Plating Modified with Blocking Agents Improved electroless coatings can be made with a modified plating technique that requires at least 3 steps: (1) electrolessly plating metal onto a surface; (2) attaching a blocking ligand to the electrolessly plated metal; and (3) electrolessly plating the same or a different metal onto the material from step (2). These steps can be repeated as many times as desired. Optionally, the blocking ligand can be removed. The blocking ligand can be removed either before or after step (3). Also, optionally, a structure stabilizing material can be added to maintain high surface area during sintering and/or during use (which would typically be conducted at elevated temperature). This modification can be conducted with any electroless metals, as previously described. This process can be used to selectively block certain areas such as selected channels in a device while permitting continued electroless plating in other areas.

The ligand can be any ligand that is known in the art to bind to low valent or zero valent metals. Desirable blocking ligands are those that are bonded to the metals more strongly than solvents or other materials with which the surface may be treated, but can still be removed by thermal or chemical methods without damaging the electroless coating. One preferred ligand is CO. In some preferred embodiments, the ligand comprises an anchoring functionality such as amine, acetate, thiol, ether, phosphate, phosphine, acyl, thiocarbonyl, etc. The blocking can be, for example, steric; by blocking the most reactive parts of the metal particles; or by creating a hydrophobic surface selectively over the metal surfaces.

The blocking ligand can be removed by appropriate treatment. For example, CO on Pt could be removed by heating (for example to 900° C.) in an inert atmosphere or dilute $H_2$.

The structure stabilizing material is preferably an oxide that forms a thin coat and densifies to a robust structure capable of resisting sintering. Examples include alumina sol, colloidal alumina, silica sol, titania sol, metal alkoxide (such as silicon or titanium alkoxide), or other precursor to a metal oxide.

We claim:

1. A catalyst structure, comprising:
   a dense substrate, and
   a porous metal adhered to the dense substrate,
   particles of metal oxides disposed in the porous metal; and
   a bi-modal distribution of pore sizes in the porous metal.

2. The structure of claim 1 wherein the dense substrate comprises a wall of the microchannel apparatus.

3. The catalyst structure of claim 2 wherein the microchannel apparatus comprises a chemical reactor.

4. The catalyst structure of claim 2 wherein the microchannel apparatus comprises reactive distillation apparatus.

5. The catalyst structure of claim 2 wherein the wall is an iron based alloy or a Ni-, Co- or Fe-based superalloy.

6. The catalyst structure of claim 1 comprising a bi-modal distribution of pore sizes in the porous metal wherein the large pores are in the size range of 0.1 to 10 micrometers (μm) and the small pores are in the range from 1 to 10 nm.

7. The catalyst structure of claim 6 wherein at least 90% of total pore volume is within the two ranges that define the bimodal distribution.

8. The catalyst structure of claim 1 wherein the porous metal is a post-assembly coating.

9. The catalyst structure of claim 8 wherein the post-assembly fills gaps or cracks in the microchannel apparatus.

10. The catalyst structure of claim 1 wherein metal oxide particles are exposed within the pores of the porous metal.

11. The catalyst structure of claim 1 wherein a metal oxide coating is disposed between the substrate and the porous metal.

12. The catalyst structure of claim 10 wherein porous metal is made method of forming a metal coating on a substrate, comprising:
    providing a liquid composition comprising a metal complex;
    contacting the substrate with microparticles;
    wherein the microparticles comprise a removable material and a non-removable metal oxide;
    contacting the substrate with the liquid composition;
    reacting the metal complex with a reducing agent; and
    removing the removable material to form the porous metal coating on the substrate.

13. A fuel cell comprising a catalyst structure, the catalyst structure, comprising:
    a dense substrate, and
    a porous metal adhered to the dense substrate,
    particles of metal oxides disposed in the porous metal; and
    one or more of the following features:
       an average pore size of at least 1 micron in the porous metal; or
       a bi-modal distribution of pore sizes in the porous metal.

14. The fuel cell of claim 13 wherein the porous metal comprises Pt, Pd, Rh, Ag, Cu, Au, Fe, Co, Re, and their alloys.

15. The fuel cell of claim 14 wherein the porous metal comprises Pt—Rh, Pt—Pd, Pt—Au, Pt—Pd—Au, Pt—Cu and Pt—Ag.

* * * * *